Nov. 21, 1961 — H. R. WEITKEMPER ET AL — 3,009,720
WIRE CLAMP
Filed Jan. 21, 1959 — 2 Sheets-Sheet 1

Harry R. Weitkemper
Charles S. Coyle,
Inventors.
Koenig and Pope,
Attorneys.

Nov. 21, 1961  H. R. WEITKEMPER ET AL  3,009,720
WIRE CLAMP

Filed Jan. 21, 1959  2 Sheets-Sheet 2

Harry R. Weitkemper,
Charles S. Coyle,
    Inventors.
Koenig and Pope,
    Attorneys.

United States Patent Office 3,009,720
Patented Nov. 21, 1961

3,009,720
WIRE CLAMP
Harry R. Weitkemper, Centralia, and Charles S. Coyle, Webster Groves, Mo., assignors to A. B. Chance Company, Centralia, Mo., a corporation of Missouri
Filed Jan. 21, 1959, Ser. No. 788,143
3 Claims. (Cl. 287—83)

This invention relates to wire clamps, and with regard to certain more specific features, to a bail-supported wedge clamp for supporting lead-in conductors and the like from supports such as insulators.

Among the several objects of the invention may be noted the provision of an improved re-usable conductor wedge clamp which will withstand large loads without deforming the wedge clamp so as to make it inoperative for re-use; the provision of an attachment between wedge and bail parts which is easy to latch into a secure holding position and which directs a large part of the bail holding force in line close to the axis of pull of the conductor; the provision of a wedge clamp and bail assembly of the class described which is adapted compactly to be folded conveniently into a tangle-free, self-protecting bundle from which pieces cannot be lost or entangled with one another; and the provision of a simple, three-piece clamp of the class described which reduces the amount of material employed and which may be economically produced. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawins, in which one of various possible embodiments of the invention is illustrated, FIG. 1 is a plan view of the wire clamp in nontangling position for packaging and shipment;

Corresponding reference characters indicate corresponding parts throughout the several views of the drawings.

Figure 1:
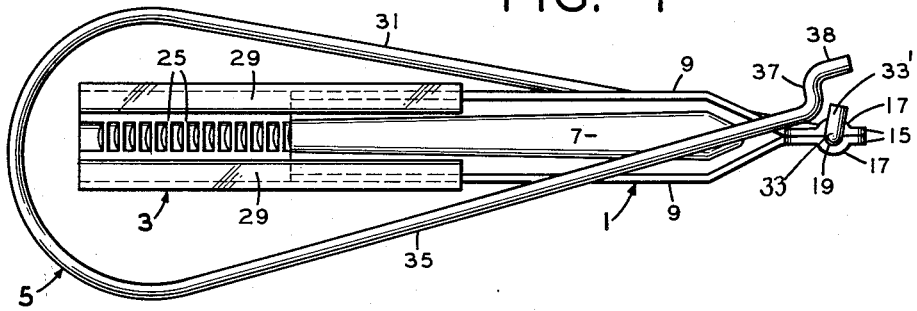
Figure 2:
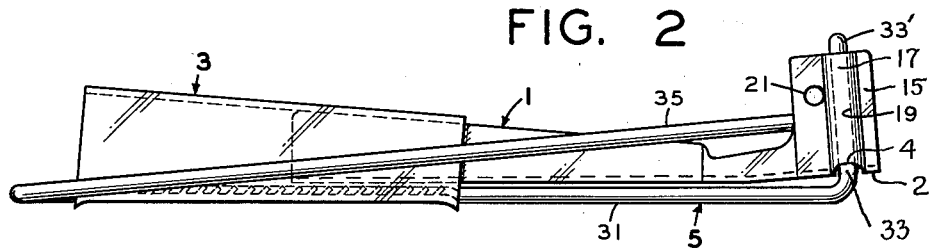
FIG. 2 is a side elevation of FIG. 1.
Figure 3:
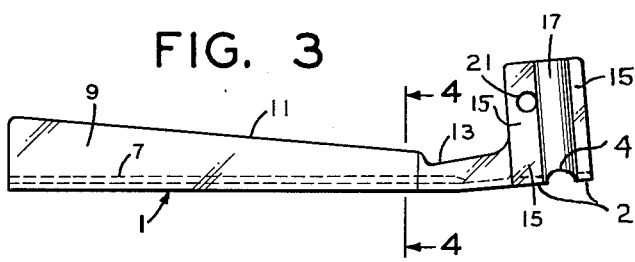
FIG. 3 is a side elevation of an inner wedge member shown on FIGS. 1 and 2.
Figure 4:
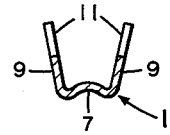
FIG. 4 is a cross section taken on line 4—4 of FIG. 3.
Figure 5:
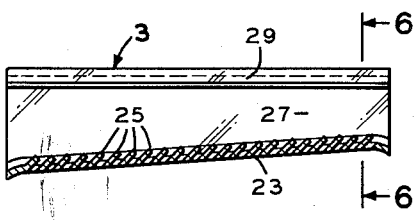
FIG. 5 is an axial section of an outer wedge member shown in FIGS. 1 and 2, being viewed on line 5—5 of FIG. 6.
Figure 6:
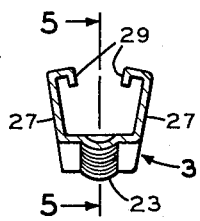
FIG. 6 is a cross section taken on line 6—6 of FIG. 5.
Figure 7:
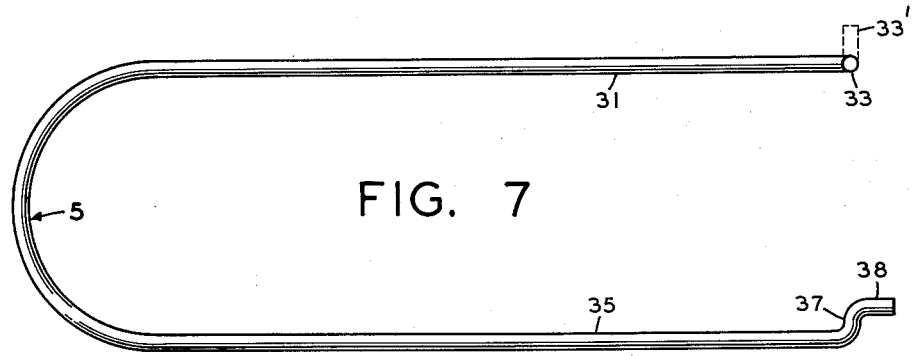
FIG. 7 is a plan view of a bail, the dotted lines showing a final bent position of one end part thereof.

Referring now particularly to FIGS. 1 and 2, there is shown at numeral 1 an inner wedge member (see also FIGS. 3 and 4); at numeral 3 an outer wedge member (see also FIGS. 5 and 6); and at numeral 5 a bail member (see also FIG. 7). The inner wedge member (FIGS. 3 and 4) consists in a stamped sheet-metal member formed into a U-shape in cross section and having an upwardly bulged channel bottom 7. The bottom is flanked by sloping side walls 9, the upper edges of which taper, as shown at 11.

At their shallowest portions, the sloping walls 9 are notched, as shown at 13, where they converge and are folded as at 2 to form two flat opposed contacting ears or sheets 15 which together form plate means. On the fold line 2 is an opening 4. The ears are provided with transverse opposed semi-circular portions 17 which together form a first cylindrical bearing-forming opening 19 extending coaxially with opening or hole 4, for example, slightly in excess of ⅛ inch in diameter. Thus the opening 19 is substantially in the plane of the plate means 15. The purpose of the portions 17 forming the opening 19 is to form a bearing. Transverse coaxial holes 21 pierce the ears 15 on the side of the hole 19 next to the notches 13. These form a second opening and may for example also be slightly greater than ⅛ inch in diameter. Thus openings 4 and 19 form a bearing transverse to the length of wedge 1. Holes 21 are transverse to openings 4 and 19.

The outer wedge member 3 (FIGS. 5 and 6) is also of U-shape, having a downwardly bulged channel bottom 23. Gripping parts 25 are formed in channel bottom 23, substantially throughout its length. The sides 27 of member 3 also slope as shown in FIG. 6, and are wedge-shaped in an axial direction. Their outer margins are terminated by inwardly hooked flanges 29 adapted to receive them under the tapered margins of the inner wedge member 1.

The members 1 and 3 may be brought together by inserting the narrow portions of member 1 into the wider end portion of member 3 and then telescoping them axially, whereupon, in the absence of a conductor, they will take up the assembled positions shown in FIGS. 1 and 2. In this movement, the parts 15, 17 of wedge member 1 move through the space between the flanges 29 of wedge member 3.

The bail (FIG. 7) is formed of a loop of flexible wire approximately ⅛ inch in diameter, the loop being of generally U-shape as shown. One leg 31 of the loop is initially bent transversely out of the plane of the U-shape as shown at 33. The other leg 35 is twice bent to form offsets 37 and 38 approximately in the plane of the U-shape. Thus the end part of leg 35 and offsets 37 and 38 form an S-shape of which 37 is the connection between its terminal parts. As indicated by the dotted lines 33' in FIG. 7, the bend 33 is adapted to have its end again and finally bent after assembly, as will appear below.

Assembly is accomplished by inserting the bent portion 33 of the bail 5 into the hole 19 before it is again bent to form part 33'. After insertion of journal part 33 in the bearing 19 and angular bending of part 33', the latter, along with the angular part 31, maintains the bail in assembled rotary and proper axial position in the hearing 19 and with respect to the inner wedge member.

The assembly with the leg 31 of the loop on one side of the assembled wedge members 1 and 3 allows the other leg 35 of the bail loop to be sprung over the inner wedge member 1 over notch 13, as shown in FIG. 1. It then springingly engages the assembly of ears 15, which form a catch adjacent which parts 37, 38 latch. The result is a compact bundle of parts which are self-protective against entanglement with other like assemblies during shipment. Heretofore, bails on wedge clamps tended to become entangled with one another during shipment, causing considerable exasperation in untangling them preparatory to installation. In this position the bail also prevents wedge 3 from escaping to the right from wedge 1. Thus wedge 3 is held captive on wedge 1.

Figure 8:
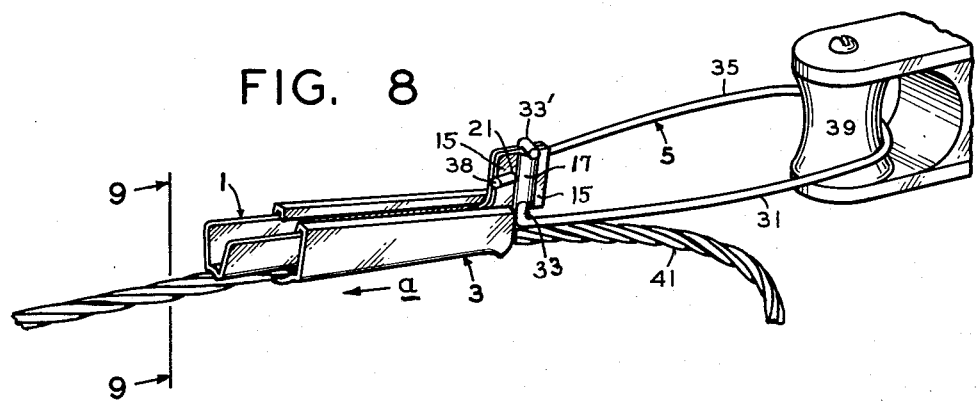
FIG. 8 is a perspective view showing the wire clamp installed in connection with a wire conductor and a supporting insulator bracket; and, FIG. 9 is a cross section viewed on line 9—9 of FIG. 8.
Figure 9:
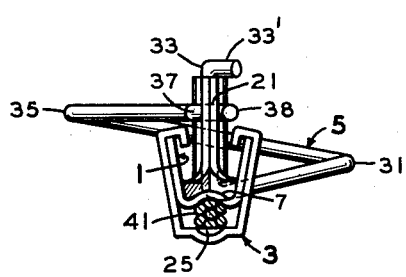

Installation is illustrated in FIGS. 8 and 9, wherein the leg 35 of the bail has been removed from behind the ears 15 and leg 31 pivoted on journal 33 in the hole 19. This places the bail in extended position. The wedge members 1 and 3 may then be separated by telescoping them in opposite directions. Bail 5 is then looped about an appropriate support, such as, for example, an insulator bracket as illustrated at 39. The leg 35 is then manipulated from the side (rotation of wedge 1 at bearing 17 permitting a sidewise relationship between holes 21 and offset 38) and the end 38 pushed into the holes 21. This brings the offset connection 37 into position near these holes. Then by rotating the bail 5 into its extended position, such as shown in FIG. 8, the connection 37 angles into the holes 21 into holding position. The end portion 38 of the S-shaped end of the bail is then positioned adjacent one of the parts 15 to form a stop wherein the bail 5 is held in an extended position from the wedge member 1.

Next the conductor 41 to be supported is laid up into the upwardly bulged channel bottom 7 of the inner wedge member 1. Then the large end of the wedge member 3 is first brought into engagement with the narrower portions of the tapered margins 11. At this time the member 3 underlies the conductor. Then by axially telescoping the member 3 back in the axis shown by the dart $a$ in FIG. 8, the wire will be wedgingly held as the upper sloping edges 11 of the side walls 9 of member 1 become engaged under the hooked members 29 of the member 3. The result is that the conductor 41 becomes engaged on its top by the channel bottom 7 of member 1 and on its bottom by the parts 25. Since the parts form grips in a direction to hold the conductor 41 in response to any tendency for it to pull out from the wedges, such pull tends to move the member 3 into tight wedging engagement with the member 1. Reaction is provided by the end portions 33 and 37 of the bail in the holes 19 and 21, respectively.

It will be observed that the lower end of the hole 19 is close to the place where the conductor 41 emerges from the assembly of wedge members 1 and 3. Thus the pull from conductor 41 and the reaction from leg 31 of the bail 1 are in fairly close alignment, approaching the ideal condition for minimum distortion of the wedge clamp parts under heavy loads without deforming any portions of the wedge clamp to the extent that it would become inoperative upon re-use. The resulting re-usability of the clamp is one of its advantages.

In order to demount the wedge clamp for re-use, the sequence of events above described is reversed, the wedge members 1 and 3 being initially loosened one from the other by pushing the conductor 41 in a direction which is opposite to that shown by the dart $a$. This tends incipiently to loosen the wedge member 3 from the wedge member 1, after which they may be readily telescoped from one another.

Another advantage of the invention is that the attachment between the jogged portions 37, 38 of leg 35 of the bail 1 with holes 21, while very secure, at the same time may be readily accomplished. Also, the amount of material required for construction is minimized, there being only three moving parts, all of which may be constructed by simple punching and forming operations. Parts 1 and 5 are preferably made of stainless steel, and part 3 is preferably made of heat-treated aluminum.

It will be understood that although a continuous flexible wire is illustrated for the bail 5, forming intermediate portions between the end members (33, 33') on the one hand, and the end portions (37, 38) on the other hand, such portions may be made of flexible cable suitably attached to these end parts, as by welding or the like.

It will be observed that any tendency under load for the journal part 33 of the bail 5 to separate the bearing-forming ears 15 will be substantially offset by the locking action of the bail parts 35 and 38 adjacent to the connecting part 37 traversing the holes 21. If desired, the strength of the device can be further increased by spot welding or otherwise holding together the ears 15.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. Connecting means for use between a wire-supporting means and a flexible supporting bail loop, comprising plate means having a first bearing-forming opening extending along an axis substantially in the plane of the plate means and having a second opening extending through the plate means crosswise with respect to said first opening and adjacent thereto, said bail loop having two legs, the end of one leg being formed as a journal rotatable in said first opening, the end of the other leg being formed as an offset catch insertible into said second opening upon flexing the loop upon some turning of said journal in one direction in said first opening, said offset catch when in said second opening interlocking with said plate means upon some turning of said journal in the reverse direction in said first opening.

2. Connecting means according to claim 1, wherein the bail loop at the ends of its legs is composed of bent wire-like material to form said journal and said offset portion.

3. Connecting means according to claim 2, wherein the journal portion of the wire-like material extends angularly from both ends of the first opening to hold the journal in axial position therein.

References Cited in the file of this patent

UNITED STATES PATENTS

| | | |
|---|---|---|
| 1,582,095 | Symes et al. | Apr. 27, 1926 |
| 1,614,105 | Comstock | Jan. 11, 1927 |
| 1,793,140 | Steinmayer | Feb. 17, 1931 |
| 1,852,031 | Steinmayer | Apr. 5, 1932 |
| 2,203,066 | Schultz | June 4, 1940 |
| 2,570,685 | John | Oct. 9, 1951 |
| 2,781,212 | Jugle | Feb. 12, 1957 |
| 2,793,886 | Weiss | May 28, 1957 |
| 2,822,198 | Priestman | Feb. 4, 1958 |
| 2,894,771 | Putnam | July 14, 1959 |